Nov. 12, 1968      K. L. JESSOP      3,409,964

PIN RETAINER FOR THROW-AWAY INSERTS

Filed Jan. 22, 1968      2 Sheets-Sheet 1

INVENTOR.
KENNETH L. JESSOP

BY

*Barlow & Barlow*

ATTORNEYS

Nov. 12, 1968   K. L. JESSOP   3,409,964
PIN RETAINER FOR THROW-AWAY INSERTS
Filed Jan. 22, 1968   2 Sheets-Sheet 2

INVENTOR.
KENNETH L. JESSOP
BY
*Barlow & Barlow*
ATTORNEYS

United States Patent Office 3,409,964
Patented Nov. 12, 1968

3,409,964
PIN RETAINER FOR THROW-AWAY INSERTS
Kenneth L. Jessop, Centerdale, R.I., assignor to Madison Industries, Inc., a corporation of Rhode Island
Filed Jan. 22, 1968, Ser. No. 699,630
4 Claims. (Cl. 29—96)

ABSTRACT OF THE DISCLOSURE

A tool holder for throw-away inserts in which a pocket is provided for the insertion of the insert, said pocket including a floor and a bore extending normal to said floor, the bore containing a locking pin which is adapted to be moved transversely in the bore, one portion of the locking pin engaging an aperture in the throw-away cutter insert by which the insert may be moved into tight engagement in the pocket.

Background of the invention

A tool holder of the type in which throw-away inserts are utilized is characterized by a pocket in which the insert may be received and clamped into position. It has been usual in the prior art to have a clamp that engages the top surface of the insert and clamp the same in the pocket. Such clamping devices have proven to be somewhat awkward in the utilization of the machining industry, and accordingly, it has become essential to provide devices which add no protuberances. Lack of protuberances or other obstructions permits the free flow of chips formed in the cutting operation.

Summary of the invention

A locking pin for a tool holder utilizing throw-away inserts of the type having a central aperture which includes a tool holder having a pocket for the reception of the cutting bit which pocket is provided with a bore through the floor thereof, and into this bore there is fitted a locking pin. The locking pin is provided on the bottom end thereof with a tapered surface and a conical set screw is adapted to engage this surface and move the pin laterally of the bore. Since the upper end of the pin engages the throw-way insert, the insert is clamped into position in the pocket.

Description of the preferred embodiment

Figure 1:
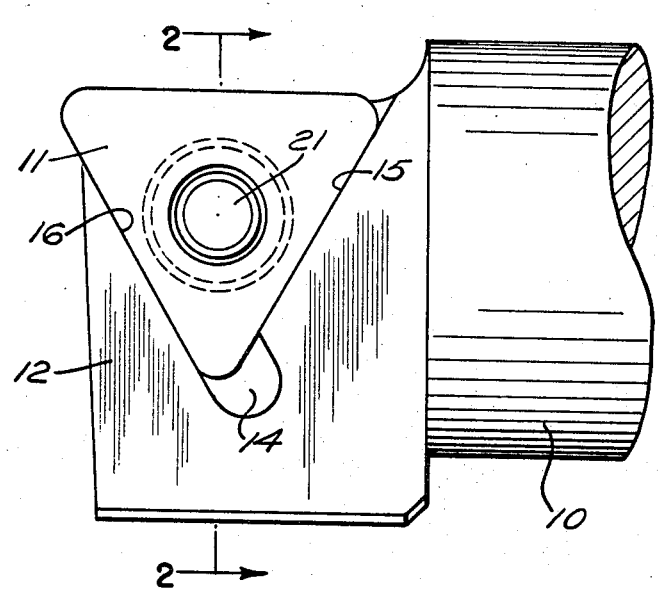
FIG. 1 is a plan view of a typical triangular throw-away cutter insert mounted in a tool holder.
Figure 2:
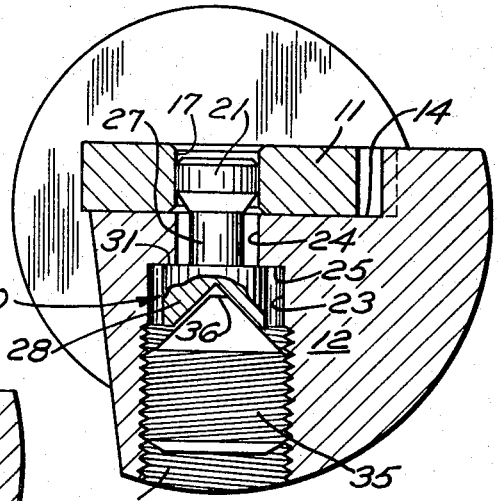
FIG. 2 is a sectional view taken on lines 2—2 of FIG. 1.
Figure 3:
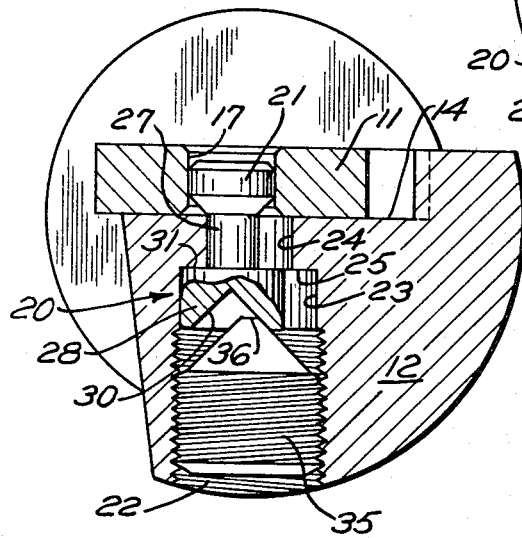
FIG. 3 is a sectional view also taken on lines 2—2 of FIG. 1 with the cutting insert in release position.
Figure 4:
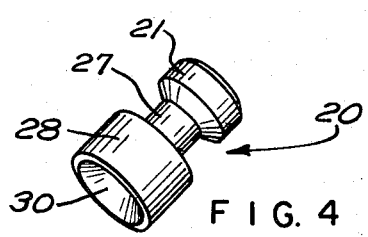
FIG. 4 is a perspective view of the locking pin.
Figure 5:
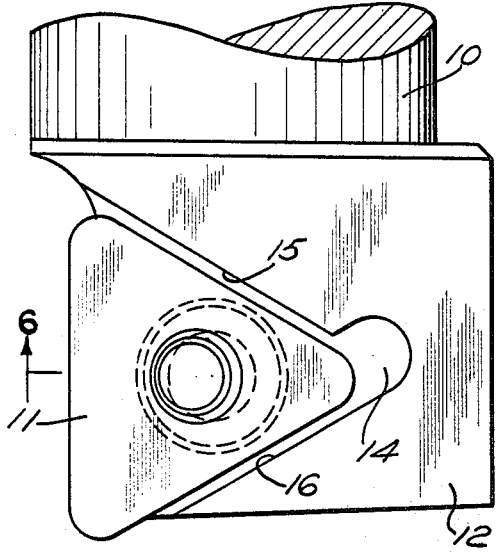
FIG. 5 is a plan view of a modified construction.
Figure 7:
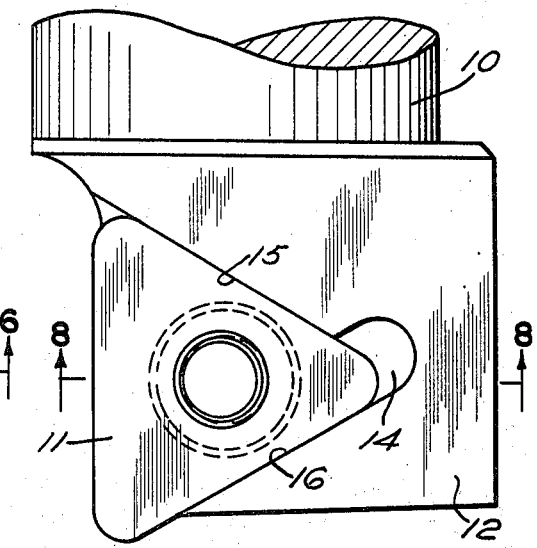
FIG. 7 is a plan view similar to FIG. 5 in clamped position.

FIG. 1 illustrates a cutting end of a tool holder generally designated 10 which has a triangular cutting throw-away insert 11 seated in a pocket of the cutting end 12 which pocket comprises a floor 14 and a pair of converging side walls 15 and 16 which are normal to the floor 14. A cylindrical hole 17 extends through the cutting insert 11 and freely receives a locking pin 20 which has an enlarged end 21 that may engage the walls as the hole 17. The locking pin 20 is inserted into a bore in the tool holder end 12, the bore comprising a threaded portion 22 which terminates in a smooth section 23 and a smaller portion 24. The junction between the bores 23 and 24 forms a shoulder 25. As will be observed, the pin 20 has the head portion 21, a neck portion 27 and an actuating end 28 forming a shoulder 31 between the neck 27 and end 28 which may slide along shoulder 25. The end 28 is provided with a conical hole providing a reaction surface 30 at an angle to the axis of threaded bore 22. A set screw 35 having a conical end 36 is threadingly engaged in the bore 22, and as will be observed referring to FIG. 3 as the screw 35 is turned, the pin 20 will be moved from left to right as shown in the drawing which will force the cutting insert to the right as viewed in the drawing, the movement being controlled by the sliding of the shoulders 25 and 31 on each other. During movement it will be appreciated that constant pressure of the locking pin is effected against the shoulder of the bore at 25, 31. Therefore, the pin will always be securely fastened within the bore structure, movement only being effected in a lateral direction with no movement permitted in an axial direction.

Figure 6:
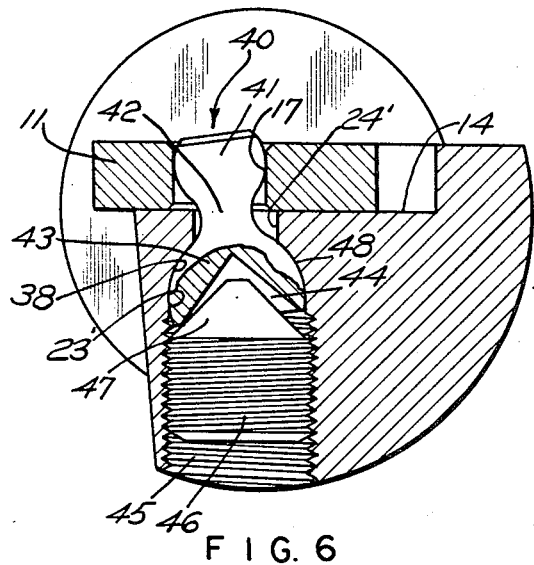
FIG. 6 is a sectional view taken on lines 6—6 of FIG. 5.
Figure 8:
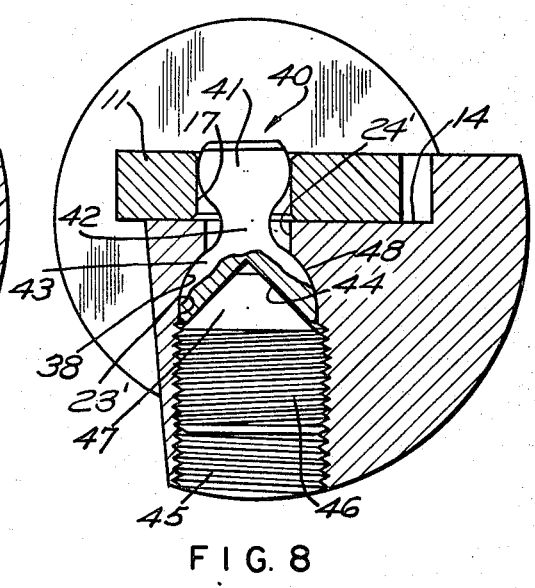
FIG. 8 is a sectional view taken on lines 8—8 of FIG. 7.

In FIG. 6 the bore is similar there being a larger portion 23′ and a smaller portion 24′. In this case the means connecting the bores of different diameters is arcuate as at 38. The pin 40 is also similar to that shown in FIGS. 1 to 4 it being provided with an enlarged head portion 41 to enter the bore 17 of the locking insert, a smaller neck portion 42 and a larger lower end 43 which is provided with an axially extending recess 44 providing a reaction surface which is at an angle to the larger portion of the bore 23′ which is threaded as at 45. A screw 46 engages the screw threads of the bore 45 and is provided with a conical end 47 similar to the conical end on the screw 35 (FIG. 3) and which conical end 47 may engage the surface 44 which is inclined to the axis of the screw 46 so as to move the pin 40 which is controlled in its movement by its arcuate surface 48 and the arcuate surface 38 of the bore. In this case the pin will have a rocking action provided by reason of the arcuate controlling surfaces 38 and 48 and the pin will rock from the position shown in FIG. 6 to the position shown in FIG. 8, thus forcing the insert 11 against the walls 15 and 16 and also against the floor 14 into secure holding.

In both cases it will be apparent that a conical end of a screw engaging a surface of the locking pin which is inclined to the axis of the screw serves to move the locking pins so as to lock the insert in position.

I claim:
1. A tool holder for use with a throw-away insert having a central hole therein, said tool holder comprising a body portion having a pocket with a floor and two side walls, bore means extending through the floor of said pocket substantially normal to the plane thereof including two portions of different diameters, a pin within said bore means, cooperating means provided between said two portions of different diameter and said pin to control the movement of said pin, a screw having a conical end movable axially in said bore portion of larger diameter, said pin having a reaction surface at an angle to the axis of said screw to be engaged by said conical end and moved thereby to urge an insert in said pocket into clamping position.
2. A tool holder as in claim 1 wherein the cooperating means between the two bore portions of different diameter and the pin control the movement of the pin to provide a bodily sliding action of the pin.

3. A tool holder as in claim 1 wherein the cooperating means between the two bore portions of different diameter and the pin control the movement of the pin to provide a pivoting action of the pin.

4. A tool holder as in claim 1 wherein the reaction surface of said pin is a conical recess.

References Cited

UNITED STATES PATENTS

| 3,289,273 | 12/1966 | Artaud | 29—96 |
| 3,320,654 | 5/1967 | Lovendahl | 29—96 |

HARRISON L. HINSON, *Primary Examiner.*